United States Patent [19]

Hampton

[11] Patent Number: 4,618,075
[45] Date of Patent: Oct. 21, 1986

[54] COMBINED STORAGE CONTAINER, SIFTER AND DISPENSER FOR FLOUR

[76] Inventor: Ernestine Hampton, 400 Mt. Washington, Los Angeles, Calif. 90065

[21] Appl. No.: 578,420

[22] Filed: Feb. 9, 1984

[51] Int. Cl.⁴ .............................................. B67D 5/58
[52] U.S. Cl. .................................... 222/189; 222/165; 209/373; 312/210.5
[58] Field of Search ............... 222/144, 185, 160, 167, 222/164, 165, 166, 189, 565, 478, 278, 266, 129, 144.5; 209/233, 374, 370, 373, 235, 259; DIG. 7/47, 368, 369; 312/210.5, 251, 252

[56] References Cited
U.S. PATENT DOCUMENTS 1,206,513 11/1916 Coppes ................................. 222/165
1,391,073 9/1921 Peters et al. ......................... 209/373
2,345,074 3/1944 Sargent et al. ...................... 222/165

Primary Examiner—Joseph J. Rolla
Assistant Examiner—Kenneth Noland
Attorney, Agent, or Firm—Christie, Parker & Hale

[57] ABSTRACT

There is provided a combination storage container for flour and system for sifting flour which operate independently to enable dispensing of select amounts of coarse or sifted flour.

9 Claims, 5 Drawing Figures

COMBINED STORAGE CONTAINER, SIFTER AND DISPENSER FOR FLOUR

FIELD OF THE INVENTION

The present invention is directed to a flour-storage apparatus and, more particularly, to an apparatus which can also dispense measured amounts of sifted or unsifted flour as called for by a food-preparation recipe.

BACKGROUND OF THE INVENTION

Food-preparation recipes often call for measured amounts of sifted or unsifted flour which would typically be measured out by hand. This can be a messy procedure and if sifted flour is called for, present sifters require removing the flour from a storage container, sifting the flour in another container, and then measuring the sifted flour from that container for use in the recipe. Accordingly, a need exists for a clean and self-contained means for dispensing sifted and unsifted flour from a storage container.

SUMMARY OF THE INVENTION

In accordance with the invention, there is provided an apparatus for clean and self-contained storing, sifting and dispensing of flour. The apparatus comprises a flour-storage container which is rotatably attached to support panels.

When the storage container is in the upright position, it is able to dispense flour through openings at its base to dispensing containers able to hold a predetermined measured amount of flour. When it is desirous to remove a dispensing container, a level plate is slid across the floor openings so that the dispensing containers can be removed without excess flour spilling from the storage container.

The apparatus preferably comprises an internal means for sifting flour which extends normal to the centerline of storage container so that when the container is rotated to a rotated position, sifted flour can be dispensed. Sifted flour is preferably dispensed either into a large container or, if a measured amount is desired, through an opening in a plate held in position below the sifter to dispensing containers able to hold the measured amount of flour. When it is desirous to remove a dispensing container, a level disc is rotated across the plate opening so that the dispensing container can be removed without excess flour spilling out of the sifter.

The preferred apparatus enables the addition of flour to the sifter either directly from the outside of the storage container or from flour already inside the storage container. In this way the process of moving flour from storage to sifter to dispenser can be completely self-contained.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
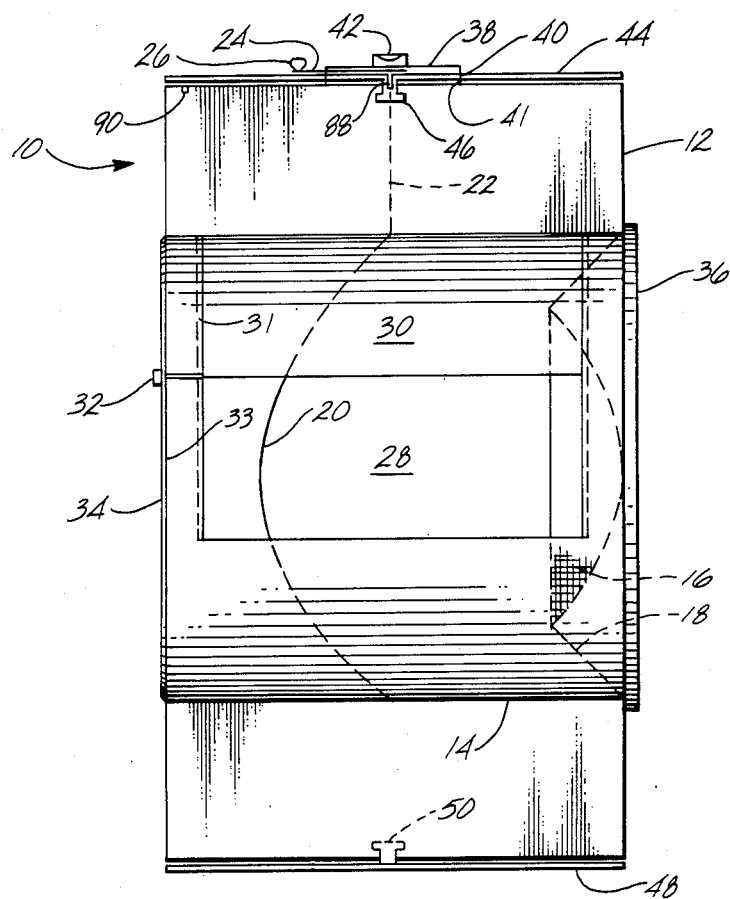
FIG. 1 shows a top view of the interior of the flour-storage container with sifter.

The present invention pertains to a combined storage container, sifter and dispenser for flour which utilizes a sifter internal to a storage container and sliding and/or rotating plates to allow clean and self-contained dispensing of measured amounts of coarse and sifted flour. The following is a description of a preferred embodiment of the invention shown in the drawings.

With reference to FIG. 1, a top view of the combined storage container, sifter and dispenser for flour 10 includes an outer storage container 12, which is generally square to rectangular in cross-section. While a rectangular cross-section is shown, other appropriate cross-sections such as cylindrical and the like may be used with apparent minor modifications to the components described herein. Extending across the width of the central interior of storage container 12 is the hollow, generally cylindrical, internal sifter housing 14. The right end, as viewed in FIG. 1, of housing 14 is blocked by spherically formed sifter screen 16, which is attached to the rim of housing 14 by the generally conical screen holder 18.

To enable flour to be sifted through screen 16, the generally semicircular sifter hoop 20 is provided. Hoop 20 is positioned midway along the length of housing 14 so that it can rotate freely inside housing 14 and will pass over the interior surface of screen 16, generating a sifting action. Hoop 20 is rotated by means of sifter shaft 22, which is connected through the wall of container 12 to one end of external sifter handle 24. At the other end of handle 24 is outwardly-facing knob 26 for easier turning of handle 24.

Figure 1A:
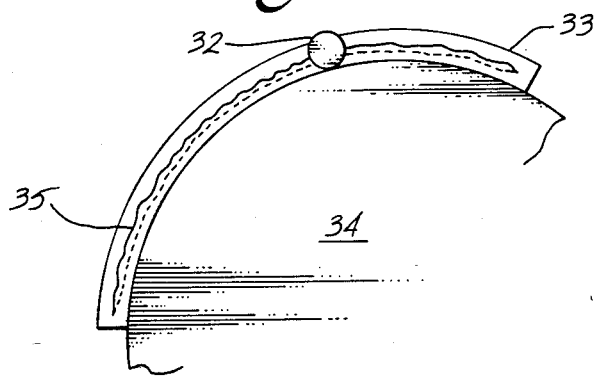
FIG. 1A shows a back-view detail of the flour-storage container.

To control the access of flour from inside container 12 to the interior of housing 14, a generally rectangular opening 28 is provided in the wall of housing 14. The area of opening 28 is varied by sliding flexible panel 30 along grooves 31 in two sides of opening 28. The position of panel 30 can be controlled from the exterior of container 12 by knob 32, which is connected to panel 30 through arcuate channel 33, shown in back-view detail in FIG. 1A. The external opening of channel 33 is covered by overlapping flaps 35 to prevent flour leakage. Flour can also be added directly to the interior of housing 14 through the left end, as viewed in FIG. 1, by removing sifter lid 34.

Figure 2:
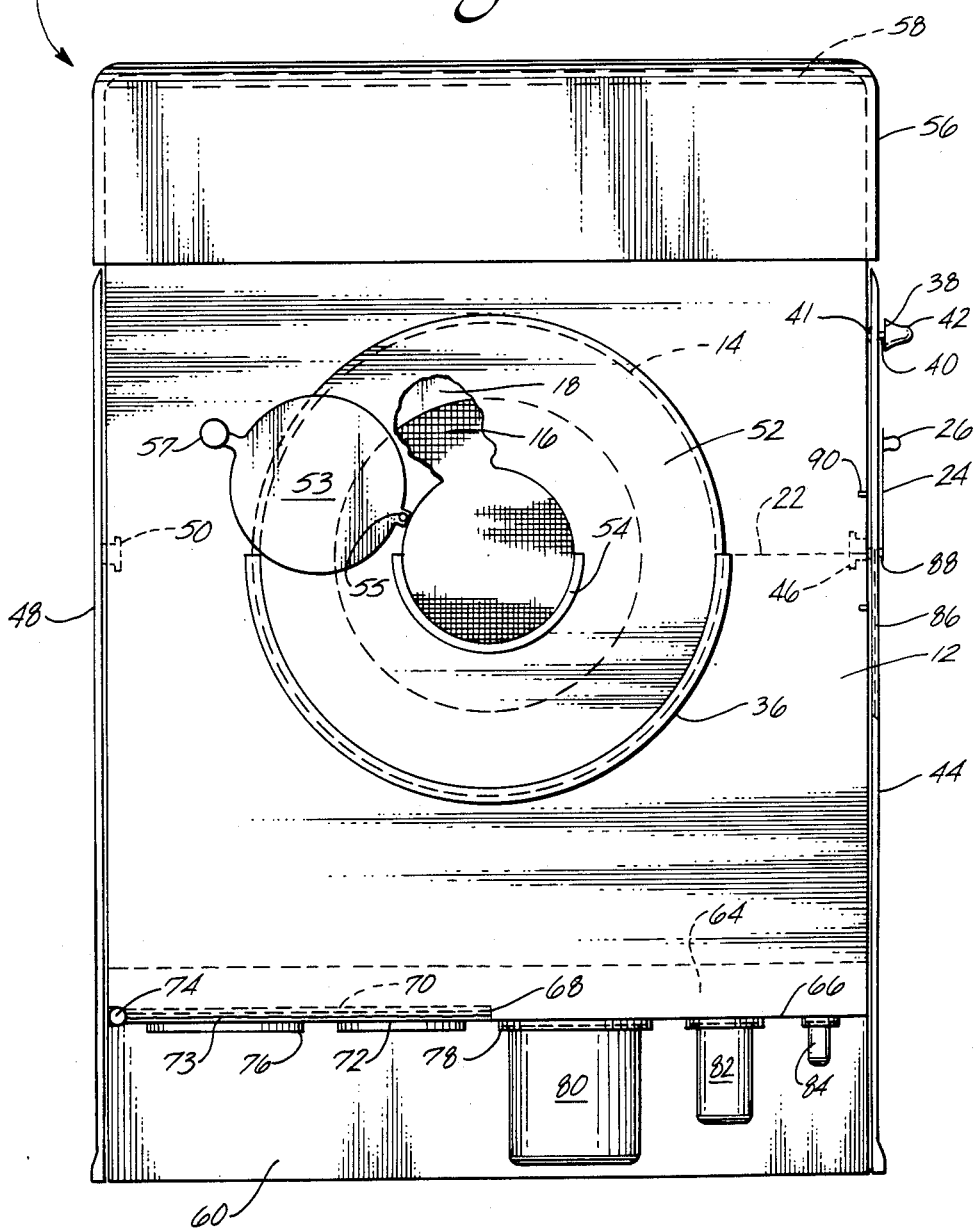
FIG. 2 shows a front view, partially cut away, of the flour storage container with unsifted-flour-dispensing area visible.
Figure 3:
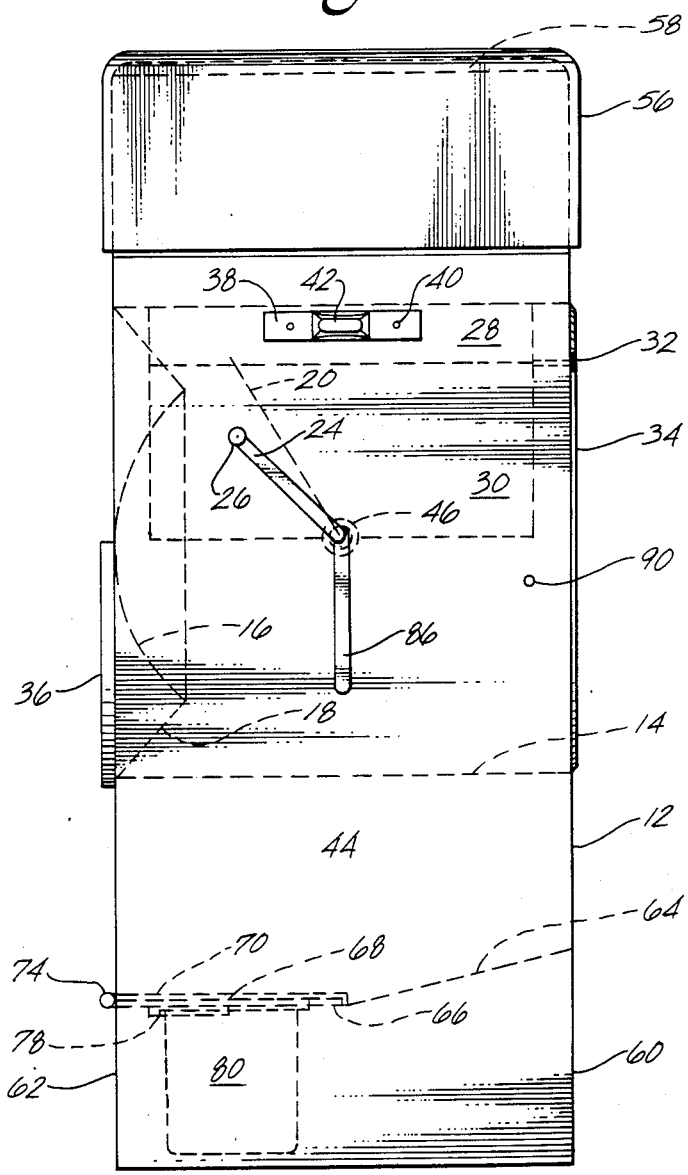
FIG. 3 shows a side view of the flour-storage container.
Figure 4:
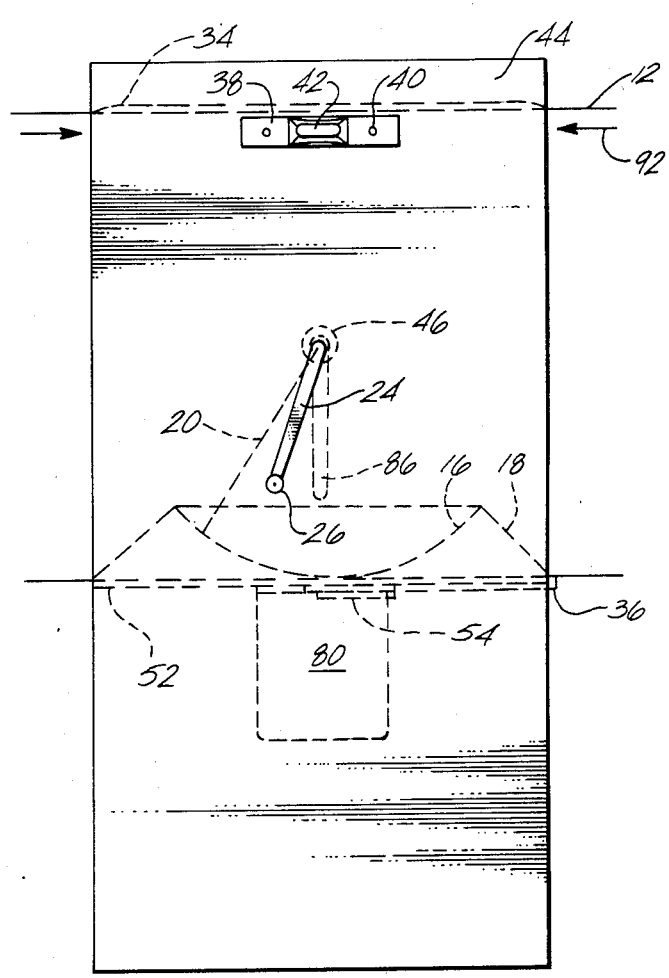
FIG. 4 shows a partial side view of the flour-storage container locked in the rotated position for dispensing a measured amount of sifted flour.

Container 12 is supported on two sides by support panels 44 and 48, which are rotatably attached to container 12 by rotating axles 46 and 50, respectively. Axle 46 is hollow to allow shaft 22 to pass through. Attached to the top part of panel 44 is locking plate 38. Pins 40 are attached to either end of the inward face of plate 38. These pins 40 extend through panel 44 and rest against the side of container 12. Ridges 41, located at a point along the length of pins 40 and flush with the inward wall of panel 44, as plate 38 is positioned in FIG. 1, hold plate 38 to panel 44. Tab 42 is attached to the center of the outward face of plate 38 to allow pins 40 to be pushed into holes 90 to lock container 12 in the flipped-up position, as shown in FIG. 4. An additional set of holes or the like could also be provided to lock container 12 in the upright position if it is desirable to prevent swinging. Since pins 40 need to be pushed in, plate 38 is spaced apart from panel 44 when container 12 is in the upright position, as shown in FIGS. 1 to 3. An identical locking means could also be located in panel 48 to provide more secure locking.

With reference to FIG. 2, a front view of the combined storage container, sifter and dispenser for flour 10 shows reducer plate 52 slid into place in semicircular reducer groove 36. Plate 52 reduces the area of the opening at the end of housing 14, which is blocked by screen 16. Plate 52 is shown partially cut away to show where screen 16 is attached to holder 18. Semicircular cup groove 54 is provided at the opening in plate 52 so that a dispenser cup can be slid in place, as shown in FIG. 4. To close the opening in plate 52 to prevent flour leakage when container 12 is the upright position, or to cut off the dispensing of sifted flour, circular disc 53 is rotatably attached to plate 52 by pin 55. Tab 57 is attached to disc 53 opposite pin 55 for easier rotating of disc 53.

Flour is added to container 12 by removing lid 58 at the top. Fitting over container 12 above lid 58 is bowl 56, which can be lifted off to be used conveniently for catching sifted flour.

Below container 12 is a zone for dispensing unsifted flour defined by the lower portions of panels 44 and 48, back skirt 60 and the floor of container 12. The front half of the floor of container 12 is a level floor 66 through which the dispensing occurs. The back half is a slanted floor 64, which is slanted upward to urge flour toward the level floor 66 where dispensing is to occur. This dispensing area is hidden from view when not in use by removable front skirt 62. The right side of floor 66, as viewed in FIG. 2, has openings beneath which dispenser cups 80, 82 and 84 are held by dispenser grooves 78. Grooves 78 are positioned about the openings in floor 66 in such a way that cups 80, 82 and 84 will not slide out when container 12 is rotated to its flipped-up position. The openings in floor 66 correspond to the cross-sectional area of the cup 80, 82 or 84 to be placed beneath. Preferably, the volumes of cups 80, 82 and 84 are selected to match standard flour volumes called for in food-preparation recipes. Gravity causes the flour in container 12 to fill up cups 80, 82 and 84 with unsifted flour. To use this flour in a recipe then, plate 68, which rests above the left side of floor 66, as viewed in FIG. 2, is slid over to cover the openings in floor 66 so that cup 80, 82 or 84 can be slid out of grooves 78 without flour spilling out. Knob 74 is attached to the left end of plate 68, as viewed in FIG. 2, through a straight channel 72 to allow plate 68 to be slid over from the outside of container 12. Channel 72 has overlapping flaps 73 covering its external opening to prevent flour leakage. To further prevent flour leakage, the preferred embodiment has a cover floor 70 fixed just above the sliding plate 68. Attached to the underside of the left half of floor 66, as viewed in FIG. 2, are storage grooves 76 for storing extra dispenser cups of standard volumes.

With reference to FIG. 3, a side view of the combined storage container, sifter and dispenser for flour 10 provides further definition of the relative locations of the components of the preferred embodiment. In addition, handle recess 86 is shown extending down from rotating axle 46 in panel 44. Recess 86 allows handle 24 to be pushed in so that its outward surface is flush with the outward surface of panel 44 to provide a more esthetically pleasing profile. To enable handle 24 to be pushed inward, handle 24 is connected to shaft 22 by a hollow, telescoping shaft 88, which is shown in FIGS. 1 and 2.

With reference to FIG. 4, a partial side view of the combined storage container, sifter and dispenser for flour 10 shows the rotated or flipped-up position for dispensing a measured amount of sifted flour. To reach the flipped-up position, container 12 is rotated about axles 46 and 50 until locking plate 38 lines up with indicator arrows 92 on the outer surface of container 12. Then, tab 42 is pressed in, to lock container 12 in this position. As shown, the reducer plate 52 is in place and dispenser cup 80 has been slid into cup groove 54. When cup 80 is full, disc 53 is rotated into place and the desired measure of sifted flour is removed without flour spillage. While only one reducer plate has been described, others with varying-sized central openings and operating in the same general way could be used to dispense sifted flour in any desired amount with a corresponding dispenser cup. Also, with no reducer plate in place, flour could be rapidly sifted into larger containers.

The preceding description has been presented with reference to a presently preferred embodiment of the invention shown in the accompanying drawings. Workers skilled in the art and technology to which this invention pertains will appreciate that alterations and changes in the described apparatus and structure can be practiced without meaningfully departing from the principles, spirit and scope of this invention. Accordingly, the foregoing description should not be read as pertaining only to the precise structures and techniques described, but rather should be read consistent with and as support for the following claims which are to have their fullest fair scope.

What is claimed is:

1. An apparatus for storing, sifting and dispensing of flour comprising:
   a flour storage container providing at opposed container ends thereof a first flour inlet and a first flour outlet;
   means for sifting flour contained by the storage container and disposed between the first flour inlet and first flour outlet and providing at least a second flour inlet separate from the first flour inlet and a sifted flour outlet separate from said first flour outlet and opposed the second flour inlet; and
   support means for said storage container, said support means rotatably supporting the storage container to enable, by rotation of said storage container, independent dispensing of flour from said first flour outlet or said sifted flour outlet by positioning said storage container for flour at a position where gravity will aid the discharge of flour through the first flour outlet or sifted flour through the sifted flour outlet.

2. An apparatus as claimed in claim 1 additionally comprising means for collecting the discharged flour in a predetermined measured amount and means to terminate the discharge of flour when the predetermined measured amount is reached.

3. An apparatus as claimed in claim 1 or 2 additionally comprising means for collecting the discharged sifted flour in a predetermined measured amount including means to terminate the discharge of sifted flour when the predetermined measured amount is reached.

4. An apparatus as claimed in claim 1 or 2 additionally comprising means to transfer flour internal of the storage container from the storage container to the means for sifting flour.

5. An apparatus for storing, sifting and dispensing flour comprising:
- a storage container for flour having a first flour inlet and a first flour outlet; and
- means for sifting flour contained within the storage container for flour at an angle substantially normal to the axis of the storage container and having a second flour inlet external to the storage container and an outlet for sifted flour opposed to the second flour inlet; and
- support means for said storage container, said support means rotatably supporting the storage container to enable, by rotation of said storage container, independent dispensing of flour from said first flour outlet or said sifted flour outlet by positioning said storage container for flour at a position where gravity will aid the discharge of flour through the first flour outlet or sifted flour through the sifted flour outlet.

6. An apparatus as claimed in claim 5 additionally comprising means for collecting the discharged flour in a predetermined measured amount and means to terminate the discharge of flour when the predetermined measured amount is reached.

7. An apparatus as claimed in claim 5 or 6 additionally comprising means for collecting the discharged sifted flour in a predetermined measured amount including means to terminate the discharge of sifted flour when the predetermined measured amount is reached.

8. An apparatus as claimed in claim 5 or 6 additionally comprising means to transfer flour internal of the storage container from the storage container to the means for sifting flour.

9. An apparatus for storing, sifting and dispensing of flour comprising:
- a flour storage container providing at opposed storage container ends a first flour inlet and a plurality of flour outlets;
- means for sifting flour contained within the flour storage container at an angle substantially normal to the axis of the storage container and having a flour inlet external to the flour storage container and an outlet for sifted flour;
- support means for said storage container, said support means rotatably supporting the storage container to enable by rotation of said storage container independent selective dispensing of flour from said plurality of flour outlets or said outlet for sifted flour;
- means to transfer flour internal of the storage container from the storage container to the means for sifting flour, said means controlled by flexible plate means operative external of the storage container;
- sliding plate means to control selective discharge of flour through the plurality of flour outlets in the flour storage container;
- slanted floor means for urging flour to discharge through the plurality of flour outlets in the flour storage container;
- a plurality of measuring containers each corresponding to one of the plurality of flour outlets and each capable of holding a select predetermined volume of flour;
- groove means provided at each of the plurality of flour outlets enabling the corresponding measuring containers to be removably held in place at the flour outlets;
- a plurality of annular plate means having central openings of different cross-sectional areas for varying the size of the outlet for sifted flour;
- groove means provided at the outlet for sifted flour able to hold each of the plurality of annular plate means in place at the outlet for sifted flour for varying the size of the outlet for sifted flour;
- a plurality of measuring containers each corresponding to one of the central openings in the plurality of annular plate means and each capable of holding a select predetermined volume of flour;
- groove means provided at each of the central openings enabling the corresponding measuring containers to be removably held in place at the central openings; and
- means for locking the flour storage container in either one of its independent dispensing positions.

* * * * *